US012641375B2

(12) United States Patent
Scheek et al.

(10) Patent No.: US 12,641,375 B2
(45) Date of Patent: May 26, 2026

(54) SPEAKER DEVICE

(71) Applicant: Sonos, Inc., Goleta, CA (US)

(72) Inventors: Timothy Ruben Scheek, Rotterdam (NL); Mattias Jeffrey Scheek, Amsterdam (NL); Lars Wouterse, Delft (NL); Onno Hein Steenhuis, Rotterdam (NL); Sanjit Shankar, The Hague (NL); Naphur van Apeldoorn, Amsterdam (NL); Thomas Hofs, Rotterdam (NL)

(73) Assignee: Sonos, Inc., Goleta, CA (US)

( * ) Notice: Subject to any disclaimer, the term of this patent is extended or adjusted under 35 U.S.C. 154(b) by 22 days.

(21) Appl. No.: 18/696,927

(22) PCT Filed: Sep. 29, 2022

(86) PCT No.: PCT/US2022/077272
§ 371 (c)(1),
(2) Date: Mar. 28, 2024

(87) PCT Pub. No.: WO2023/060009
PCT Pub. Date: Apr. 13, 2023

(65) Prior Publication Data

US 2024/0397266 A1 Nov. 28, 2024

(30) Foreign Application Priority Data

Oct. 7, 2021 (EP) .................................... 21201399
Oct. 7, 2021 (EP) .................................... 21201404
Oct. 7, 2021 (EP) .................................... 21201405

(51) Int. Cl.
*H04R 9/06* (2006.01)
*H04R 1/02* (2006.01)
(Continued)

(52) U.S. Cl.
CPC ............. *H04R 9/063* (2013.01); *H04R 1/025* (2013.01); *H04R 1/403* (2013.01); *H04R 7/12* (2013.01);
(Continued)

(58) Field of Classification Search
CPC .......... H04R 1/025; H04R 1/403; H04R 7/12; H04R 7/18; H04R 9/043; H04R 9/045;
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
JP H07264696 A 10/1995
(Continued)

OTHER PUBLICATIONS

AudioTron Quick Start Guide, Version 1.0, Mar. 2001, 24 pages.
(Continued)

*Primary Examiner* — Huyen D Le
(74) *Attorney, Agent, or Firm* — Fortem IP LLP

(57) ABSTRACT

A speaker device (101, 201, 301) comprising a first diaphragm (103, 203, 303), an opposing second diaphragm (104, 204, 304), and a frame (102, 202, 302) comprising a first frame part (102*a*, 202*a*) on which the first diaphragm (103, 203, 303) is mounted and an opposing second frame part (102*b*, 202*b*) on which the second diaphragm (104, 204, 304) is mounted. A first speaker driver (105, 205, 305) drives the first diaphragm (103, 203, 303) and a second speaker driver (106, 206, 306) drives the second diaphragm (104, 204, 304). The first frame part (102*a*, 202*a*), a movable first coil bracket (107) of the first speaker driver (105, 205, 305),
(Continued)

and a resilient first damper member (111) form a first single piece integrally formed unitary component. The second frame part (102*b*, 202*b*), a moveable second coil bracket (109) of the second speaker driver (106, 206, 306) and a resilient second damper member (112) form a second single piece integrally formed unitary component.

20 Claims, 8 Drawing Sheets

(51) Int. Cl.

| | |
|---|---|
| ***H04R 1/40*** | (2006.01) |
| ***H04R 7/12*** | (2006.01) |
| ***H04R 7/18*** | (2006.01) |
| ***H04R 9/04*** | (2006.01) |
| ***H04R 31/00*** | (2006.01) |

(52) U.S. Cl.
CPC ............... *H04R 7/18* (2013.01); *H04R 9/043* (2013.01); *H04R 9/045* (2013.01); *H04R 9/046* (2013.01); *H04R 31/006* (2013.01); *H04R 2209/026* (2013.01); *H04R 2400/11* (2013.01)

(58) Field of Classification Search
CPC ...... H04R 9/046; H04R 9/063; H04R 31/006; H04R 2209/026; H04R 2400/11
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 11,166,107 | B1 * | 11/2021 | Scheek .................. H04R 9/063 |
| 11,962,988 | B2 * | 4/2024 | Scheek .................... H04R 7/04 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2006/0012551 | A1 | 1/2006 | Chiu et al. |
| 2006/0120551 | A1 | 6/2006 | Enomoto et al. |
| 2007/0142944 | A1 | 6/2007 | Goldberg et al. |
| 2016/0221822 | A1 | 8/2016 | Krumbein et al. |
| 2019/0335277 | A1 | 10/2019 | Xie et al. |
| 2020/0296502 | A1 | 9/2020 | Scheek et al. |
| 2020/0344554 | A1 | 10/2020 | Scheek et al. |

FOREIGN PATENT DOCUMENTS

| | | | |
|---|---|---|---|
| JP | H07284195 | A | 10/1995 |
| JP | 2000184482 | A | 6/2000 |
| JP | 2008263257 | A | 10/2008 |
| JP | 2009088741 | A | 4/2009 |
| JP | 2021506159 | A | 2/2021 |
| JP | 2022525721 | A | 5/2022 |
| WO | 200153994 | | 7/2001 |
| WO | 2003093950 | A2 | 11/2003 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion mailed on Jun. 29, 2023, issued in connection with International Application No. PCT/US2022/077272, filed on Sep. 29, 2022, 34 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *DM Holdings*, DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Bureau, International Preliminary Report on Patentability, mailed on Apr. 18, 2024, issued in connection with International Application No. PCT/US2022/077272, filed on Sep. 29, 2022, 14 pages.
International Searching Authority, International Search Report and Written Opinion mailed on Jun. 29, 2023, issued in connection with International Application No. PCT/US2022/077272, filed on Sep. 29, 2022, 20 pages.
Japanese Patent Office, Notice of Reasons for Refusal and Translation mailed on May 20, 2025, issued in connection with Japanese Patent Application No. 2024-520922, 11 pages.

(56) References Cited

OTHER PUBLICATIONS

Korean Patent Office, Korean Examination Report and Translation mailed on Apr. 29, 2025, issued in connection with Korean Application No. 10-2024-7014200, 19 pages.

* cited by examiner

SPEAKER DEVICE

CROSS-REFERENCE TO RELATED APPLICATIONS

The present application is a 371 national phase application of International Application No. PCT/US2022/077272, filed Sep. 29, 2022, which claims the benefit of priority to European Patent Application No. 21201399.9, filed Oct. 7, 2021; European Patent Application No. 21201404.7, filed Oct. 7, 2021; and European Patent Application No. 21201405.4, filed Oct. 7, 2021, each of which is incorporated by reference herein in its entirety.

TECHNICAL FIELD

The present invention relates to a speaker device, in particular a speaker device with an integrated suspension driver. The present invention further relates to a speaker device, particularly to a speaker device with a low profile and small form factor. The present invention even further relates to a speaker device, in particular a speaker device with an integrated printed circuit board.

BACKGROUND

Speakers are e.g. known from US patent publications U.S. Pat. No. 6,853,734, which discloses a resilient flat speaker damper, U.S. Pat. No. 7,366,318, which discloses a suspension for the voice coil of a loudspeaker drive unit, and U.S. Pat. No. 8,311,263, which discloses a spider arrangement for an electromagnetic vibrator usable in a loudspeaker.

The most important development in loudspeakers is to make loudspeakers more powerful and more compact, preferably without compromising on efficiency and cost. A loudspeaker is deemed powerful if it has a relatively high maximum sound pressure level and can easily reproduce lower frequencies, for instance below 100 Hz, taking the size of the driver and housing into account.

Compact loudspeaker systems are also often low in weight. Undesirable mechanical vibrations can occur when a loudspeaker diaphragm makes high excursions in a lightweight housing. One solution is to add a second driver facing away from the existing driver, an arrangement that is sometimes known as dual, opposing driver cancellation (DODC). An advantage of DODC is that mechanical vibrations from the two drivers cancel out. A disadvantage of DODC is that the housing is at least twice as large because the two drivers are arranged back-to-back against each other: this increase in housing size is undesirable for a compact loudspeaker system.

An alternative opposed driver configuration is described in U.S. Pat. No. 9,609,405 in which a number of drivers are placed side-by-side in the same lateral plane, with a first set of drivers facing one direction and a second set of drivers facing the opposite direction so that farces from the two sets of drivers cancel out. The configuration described in U.S. Pat. No. 9,609,405 achieves a low transverse profile, or height, comparable to a single driver by arranging the sets of drivers in a lateral plane. However, the drivers must be in an 'A-B-B-A' configuration to avoid vibrations and/or moments of force when the drivers are in use. Thus, a low transverse profile is achieved at the expense of a greater lateral profile.

Speaker units are well known in the prior art, such as speaker transducers comprising a cone-shape speaker membrane and a membrane driver or actuator coaxially arranged with respect to the speaker membrane at a back side thereof. These speakers have one coil, and thus require a limited amount of wiring to connect this coil to a terminal on the frame, or directly to an amplifier. Speakers with multiple drive units require more wiring, and if other functions need to be integrated (temperature sensing, proximity sensing, location etc.), while at the same time there is a requirement for high frame rigidity, a new solution had to be developed in order to create an attractive proposition for the speaker market.

SUMMARY

A first aspect of the present invention seeks to provide a speaker device with reduced external dimensions and having a minimum of components whilst providing high performance and linearity.

According to the first aspect of the present invention, a speaker device is provided comprising a frame, a first diaphragm and a second diaphragm, wherein the frame comprises a first frame part on which the first diaphragm is mounted and an opposing second frame part on which the second diaphragm is mounted: a first speaker driver configured to drive the first diaphragm and a second speaker driver configured to drive the second diaphragm. The first speaker driver comprises a movable first coil bracket and a first diaphragm connecting member connected to the first diaphragm and the first coil bracket. The second speaker driver comprises a movable second coil bracket and a second diaphragm connecting member connected to the second diaphragm and the second coil bracket. A resilient first damper member connects the first coil bracket to the first frame part and a resilient second damper member connects the second coil bracket to the second frame part. The first frame part, the first coil bracket and the first damper member form a first single piece integrally formed unitary component, and wherein the second frame part, the second coil bracket and the second damper member form a second single piece integrally formed unitary component.

By providing the first and second frame parts, the first and second coil brackets, and the first and second damper members as a first and second single piece component respectively allows utilization of e.g. single step injection molding processes for manufacturing the first and second frame parts, the first and second coil brackets, and the first and second damper members. Such single step injection molding processes reduce manufacturing cost and manufacturing complexity considerably. Moreover, as the first and second frame parts, the first and second coil brackets, and the first and second damper members form first and second single piece components greatly facilitates a more compact and flatter design of the speaker device.

A second aspect of the present invention seeks to provide a speaker device with a low profile and small form factor whilst maintaining performance.

According to the second aspect of the present invention, a speaker device of this type is provided comprising a first side and a spaced apart opposing second side, a frame, a first diaphragm and a second diaphragm, wherein the first diaphragm is mounted in the frame at the first side and the second diaphragm is mounted in the frame at the second side. A first speaker driver is configured to drive the first diaphragm and a second speaker driver is configured to drive the second diaphragm, and wherein the first diaphragm and second diaphragm have different shapes.

By virtue of the first and second diaphragms having difference shapes allows for good sound range and performance whilst providing a small profile speaker device. That is, the first diaphragm may have a shape to meet first sound requirements and wherein the second diaphragm may have a shape to meet second sound requirements. Moreover, the different shapes for the first and second diaphragms may allow for a secondary speaker member, e.g. a tweeter, to be fitted next to the first or second diaphragm in compact manner if so desired.

For example, in an embodiment, the first diaphragm may be a substantially flat diaphragm and wherein the second diaphragm may be a concave diaphragm. Such flat and concave diaphragms may be configured to meet particular sound requirements whilst maintaining a low profile (e.g. thickness) for the speaker device.

A third aspect of the present invention seeks to provide a speaker unit having small dimensions and as many functions integrated in as little parts as possible, yet providing a linear response characteristic.

According to the third aspect of the present invention, a speaker device of this type is provided, comprising a frame having a first frame side and a spaced apart opposing second frame side, a first diaphragm mounted in the frame at the first frame side and an opposing second diaphragm mounted in the frame at the second frame side. A first speaker driver is configured to drive the first diaphragm and a second speaker driver is configured to drive the second diaphragm. A printed circuit board, PCB, is electrically connected to the first and second speaker driver and wherein the PCB provides one or more positions for connecting the speaker device to an external device, and wherein the first frame side and/or the second frame side of the frame comprises the PCB.

The PCB on the first frame side and/or the second frame side allows for a compact electrical arrangement for controlling the first and second speaker drivers as well as connecting the speaker device to external devices. Furthermore, the PCB increases structural rigidity of the first and/or the second frame side and as such rigidity of the entire frame is increased, thereby reducing resonance for example.

BRIEF DESCRIPTION OF THE DRAWINGS

The present invention will be discussed in more detail below, with reference to the attached drawings, in which

FIGS. 12A-12C show embodiments of similarly shaped opposing diaphragms as used in conventional dual diaphragm speaker devices; and wherein

DETAILED DESCRIPTION

Figure 1:
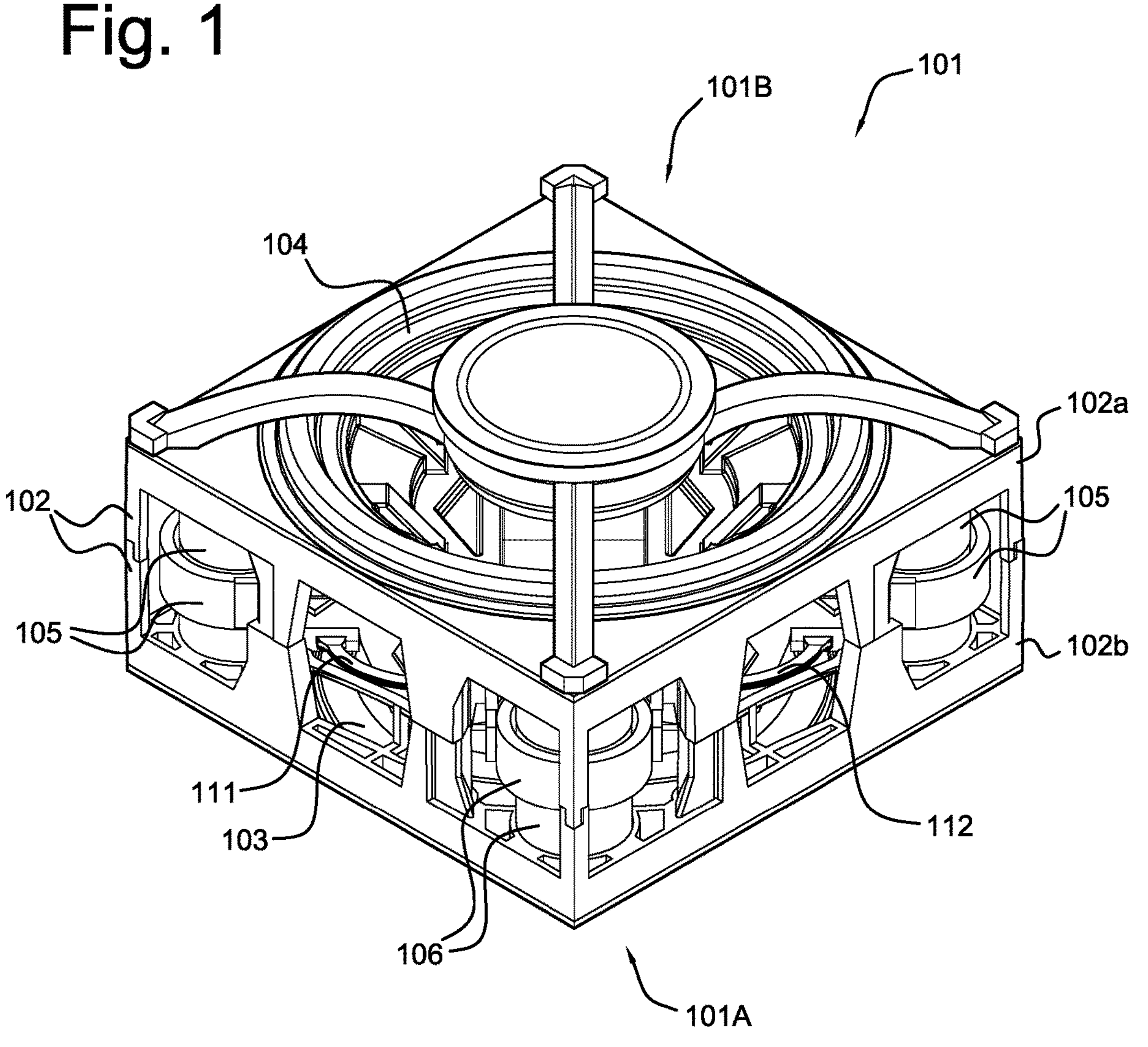
FIG. 1 shows a three dimensional view of a speaker device according to an embodiment of the present invention.
Figure 2:
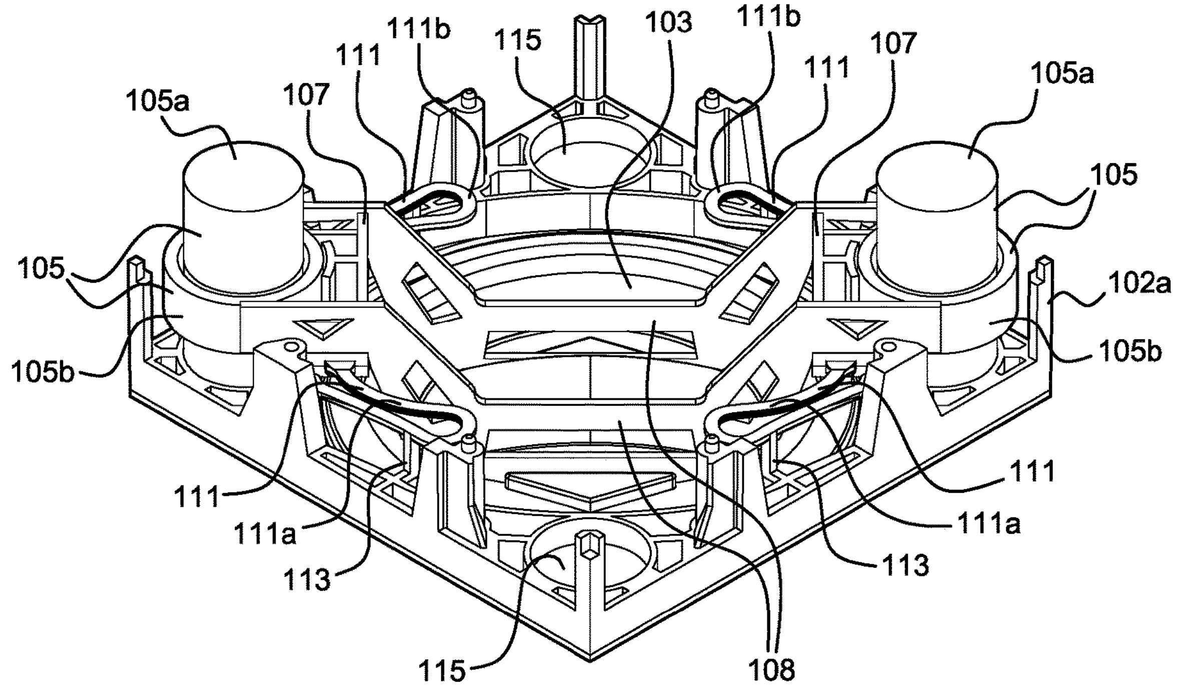
FIG. 2 shows a three dimensional view of a first frame part of a speaker device according to an embodiment of the present invention.
Figure 3:
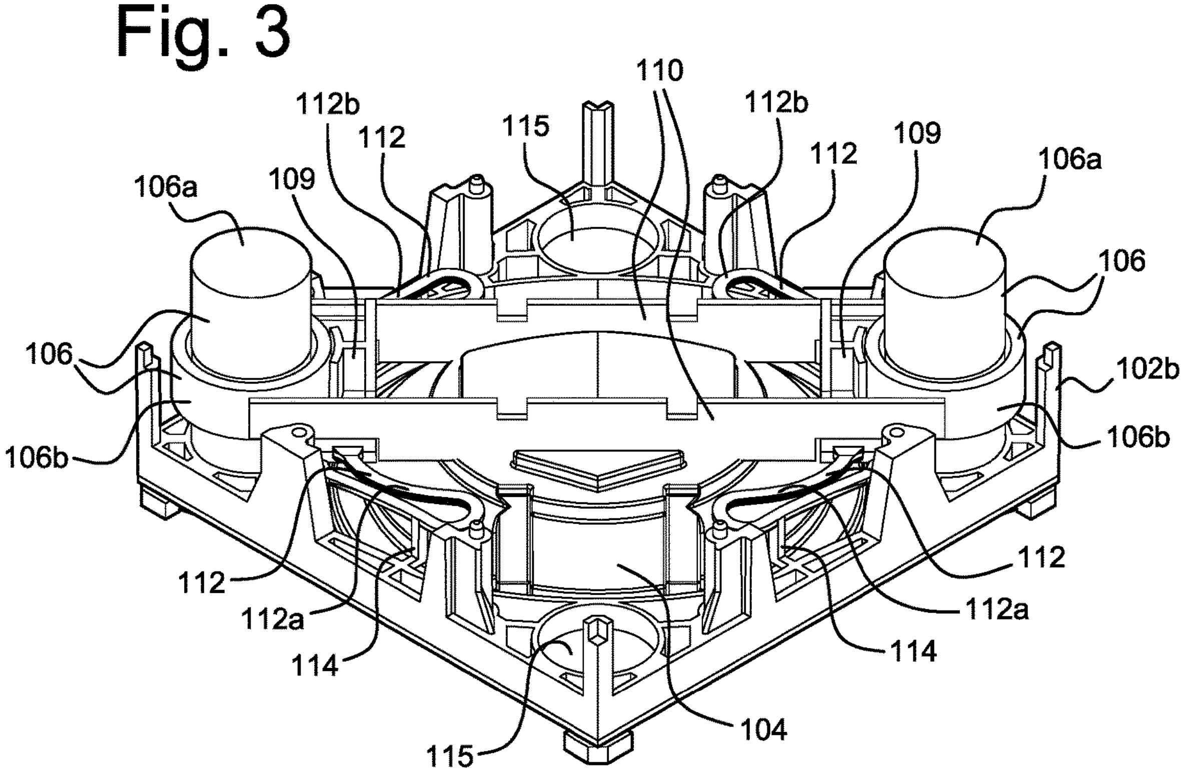
FIG. 3 shows a three dimensional view of a second frame part of a speaker device according to an embodiment of the present invention.

Referring to the FIGS. 1 to 3, a speaker device 101 is provided that comprises a frame 102, a first diaphragm 103 and a second diaphragm 104, wherein the first and second diaphragms 103, 104 are spaced apart and mounted to the frame 102 in opposing manner. As depicted, in an exemplary embodiment the first and second diaphragms 103, 104 may be considered to be spaced apart and arranged substantially parallel to one another. For example, wherein the first and second diaphragms 103, 104 are arranged in a first side 101*a* opposite to a second side 101*b*, respectively, of the speaker device 101. The first side 101*a* and the second side 101*b* may be considered to be substantially parallel and flat. It is worth noting that the first side 101*a* and the second side 101*b* may be referred to as a front side and back side of the speaker device 101 or vice versa, wherein the term “front” and “back” can be interchanged if so desired.

It is further seen that the frame 102 comprises a first frame part 102*a* on which the first diaphragm 103 is mounted and an opposing second frame part 102*b* on which the second diaphragm 104 is mounted. The first frame part 102*a* comprises the aforementioned first side 101*a* and the second frame part 102*b* comprises the aforementioned second side 101*b* of the speaker device 101.

A first speaker driver 105 is configured to drive the first diaphragm 103 and a second speaker driver 106 is configured to drive the second diaphragm 104. The first speaker driver 105 comprises a movable, e.g. linearly up-down, first coil bracket 107 and a first diaphragm connecting member 108 connected to the first diaphragm 103 and the first coil bracket 107, i.e. thereby connecting the first diaphragm 103 to the moveable first coil bracket 107.

The second speaker driver 106 comprises a movable, e.g. linearly up-down, second coil bracket 109 and a second diaphragm connecting member 110 connected to the second diaphragm 104 and the second coil bracket 109, i.e. thereby connecting the second diaphragm 104 to the moveable second coil bracket 109.

In an advantageous embodiment, the first speaker driver 105 and the second speaker driver 106 are configured to drive the first diaphragm 103 and the second diaphragm 104, respectively, in mutually opposing directions. That is, when the speaker device 101 is in use, then the first and second diaphragms 103, 104 are driven in opposing directions such that the speaker device 101 exhibits improved dynamic balancing, e.g. where opposing movements of the first and second diaphragms 103, 104 reduce unwanted resonance, vibrations etc.

A resilient first damper member 111 is provided connecting the first coil bracket 107 to the first frame part 102*a* and a resilient second damper member 112 connects the second coil bracket 109 to the second frame part 102*b*.

The first frame part 102*a*, the first coil bracket 107 and the first damper member 111 form a first single piece integrally formed unitary component, and wherein the second frame part 102*b*, the second coil bracket 109 and the second damper member 112 form a second single piece integrally formed unitary component.

According to the present invention, by providing the first and second frame parts 102*a*, 102*b*, the first and second coil brackets 107, 109, and the first and second damper members 111, 112 as respective first and second single piece components allows utilization of single step injection molding processes for manufacturing the frame 102, e.g. the first and second frame parts 102*a*, 102*b*, the first and second coil brackets 107, 109, and the first and second damper members 111, 112. Such single step injection molding processes reduce manufacturing cost and manufacturing complexity considerably. Moreover, because the first and second frame parts 102*a*, 102*b*, the first and second coil brackets 107, 109, and the first and second damper members 111, 112 form first and second single piece components, respectively, greatly facilitates a more compact and flatter design of the speaker device 101. Most advantageously, the first and second single piece components as mentioned above do not reduce the performance of the speaker device 101, i.e. high performance and linearity are provided and maintained.

It is worth noting that, in an advantageous embodiment, the first frame part 102*a*, the first coil bracket 107, and the first damper member 111 form the first single piece component and wherein this first single piece component does not intersect or overlap itself at any point when viewed in a direction perpendicular to e.g. the first side 101*a* of the speaker device 101. Likewise, in an advantageous embodiment, the second frame part 102*b*, the second coil bracket 109, and the second damper member 112 form the second single piece component and wherein this second single piece component does not intersect or overlap itself at any point when viewed in a direction perpendicular to e.g. the second side 101*b* of the speaker device 101.

In an exemplary embodiment, the first and second frame parts 102*a*, 102*b*, the first and second coil brackets 107, 109 and the first and second damper members 111, 112 form respective first and second single piece integrally formed unitary components, wherein the first and second unitary components each form a homogenous polymer part, allowing for efficient injection molding processes.

In an advantageous embodiment as depicted, the first diaphragm connecting member 108 and the second diaphragm connecting member 110 may be substantially rigid beam-like members, extending along the first and second diaphragms 103, 104, respectively, to provide good transfer of movement of the first and second coil brackets 107, 109 to the first and second diaphragms 103, 104.

It is further noted that in an exemplary embodiment the first speaker driver 105 may comprise a first magnet 105*a* and a moveable first coil 105*b* in magnetic engagement therewith, wherein the first coil 105*b* is connected to the first coil bracket 107. Likewise, the second speaker driver 106 may comprise a second magnet 106*a* and a moveable second coil 106*b* in magnetic engagement therewith, wherein the second coil 106*b* is connected to the second coil bracket 109. In an embodiment, the first coil 105*b* moveably extends around the first magnet 105*a*, and wherein the second coil 106*b* moveably extends around the second magnet 106*a*. In an exemplary embodiment, the frame 102, i.e. the first and second frame parts 102*a*, 102*b* may each comprise a plurality of cavities 115 each of which is arranged to receive a part of the first and second speaker drivers 105, 106, e.g. the first and second magnets 105*a*, 106*a* being receivable in the cavities 115.

In an advantageous embodiment, the first and second damper members 111, 112 may each have a thickness smaller than a thickness of the first and second frame part 102*a*. 102*b* respectively. By having such a smaller thickness for the first and second damper members 111, 112 allows for a resilient and flexible suspension of the first and second coil brackets 107, 109 during motion thereof.

As shown, in an advantageous embodiment, the first coil bracket 107 and the first damper member 111 form a side-by-side arrangement in a same first plane, and wherein the second coil bracket 109 and the second damper member 112 form a side-by-side arrangement in a same second plane. The side-by-side arrangements facilitate injection molding processes and e.g. removal of the first frame part 102*a*, the first coil bracket 107 and the first damper member 111 from a mold and removal of the second frame part 102*b*, the second coil bracket 109 and the second damper member 112 from a mold. In this embodiment, the first coil bracket 107 and the first damper member 111 may be considered to be arranged at a same or similar first distance as measured from e.g. the first side 101*a* of the speaker device 101, wherein the first coil bracket 107 and the first damper member 111 are then arranged next or adjacent to each other in the shared first plane, e.g, wherein the shared first plane is substantially parallel to the first side 101*a*. Likewise, the second coil bracket 109 and the second damper member 112 may be considered to be arranged at a same or similar second distance as measured from e.g. the second side 101*b* of the speaker device 101, wherein the second coil bracket 109 and the second damper member 112 are then arranged next or adjacent to each other in the shared second plane, e.g, wherein the shared second plane is substantially parallel to the second side 101*b*. In an advantageous embodiment, the same first plane and the same second plane may coincide to further reduce external dimensions of the speaker device 101.

In an exemplary embodiment, the first damper member 111 may comprise at least two resilient first damper legs 111*a*, 111*b* each of which connects the first coil bracket 107 to the first frame part 102*a*, and wherein the second damper member 112 comprises at least two resilient second damper legs 112*a*, 112*b* each of which connects the second coil bracket 109 to the second frame part 102*b*. The at least two first damper legs 111*a*, 111*b* and the at least two second damper legs 112*a*, 112*b* allow for a resilient and flexible but robust and durable connection of the first and second coil brackets 107, 109 to the first and second frame parts 102*a*, 102*b* respectively.

Note that the at least two resilient first damper legs 111*a*, 111*b* and the at least two resilient second damper legs 112*a*, 112*b* may each have a curved or arched shape and are arranged to allow for resilient movement with respect to the first and second frame parts 102*a*, 102*b*. That is, the at least two resilient first damper legs 111*a*, 111*b* may be considered to be loosely suspended between the first coil bracket 107 and the first frame part 102*a*. Likewise, the at least two resilient second damper legs 112*a*, 112*b* may be considered to be loosely suspended between the second coil bracket 9) and the second frame part 102*b*.

As mentioned earlier, the first and second frame parts 102*a*, 102*b*, the first and second coil brackets 107, 109, and the first and second damper members 111, 112 form respective first and second single piece integrally formed unitary components. As such, in the embodiment above, the first and second frame parts 102*a*, 102*b*, the first and second coil brackets 107, 109, and the at least two resilient first damper legs 111*a*, 111*b* and the at least two resilient second damper legs 112*a*, 112*b* form first and second single piece integrally formed unitary components respectively.

To achieve difference in rigidity and resilience of parts and sections of the first and second unitary components, an embodiment is provided wherein the first and second frame parts 102*a*, 102*b*, the first and second damper members 111, 112, and the first and second coil brackets 107, 109 each comprise one or more walls, wherein each wall has a wall thickness between 0.3 mm and 5 mm. So by changing the wall thickness at particular parts or sections allows specific rigidity and resiliency requirements to be fulfilled. Likewise, in an embodiment the first and second frame parts 102*a*, 102*b*, the at least two resilient first damper legs 111*a*, 111*b* and the at least two resilient second damper legs 112*a*, 112*b*, and the first and second coil brackets 107, 109 each comprise one or more walls, wherein each wall has a wall thickness between 0.3 mm and 5 mm.

In an embodiment, the one or more walls of each of the first and second damper members 111, 112 have a minimum wall thickness of 0.3 mm, thereby achieving sufficient resiliency and flexibility for movement of the first and second coil brackets 107, 109 without sacrificing robustness and durability of the first and second damper members 111, 112.

In an embodiment, the one or more walls of each of the at least two resilient first damper legs 111*a*, 111*b* and the at least two resilient second damper legs 112*a*, 112*b* have a minimum wall thickness of 0.3 mm, thereby achieving sufficient resiliency and flexibility for movement of the first and second coil brackets 107, 109 without sacrificing robustness and durability of the at least two first damper legs 111*a*, 111*b* and the at least two second damper legs 112*a*, 112*b*.

In an embodiment, the one or more walls of the first and second frame parts 102*a*. 102*b* and the one or more walls of each of the first and second coil brackets 107, 109 have a maximum wall thickness of 5 mm. This maximum wall thickness provides sufficient rigidity and keeps dimensions as small as possible for the frame 102, i.e. the first and second frame parts 102*a*, 102*b*, and the first and second coil brackets 107, 109 to withstand deformation and to allow the first and second coil brackets 107, 109 to transfer their movement to the first and second diaphragm connecting members 108, 110.

In an embodiment, the first and second diaphragm connecting members 108, 110 may also have one or more walls each of which has a maximum wall thickness of 5 mm to achieve sufficient rigidity but to keep dimensions as small as possible. Such a maximum wall thickness is readily achieved for the first and second diaphragm connecting members 108, 110 when formed as substantially flat beam-like diaphragm connecting members as shown.

As further depicted, the first and second damper members 111, 112, in particular the at least two resilient first damper legs 111*a*, 111*b* and the at least two resilient second damper legs 112*a*, 112*b*, may have a relative small wall thickness as outlined above, e.g. around 0.3 mm or somewhat thicker. Because the first and second frame parts 102*a*, 102*b*, the first and second coil brackets 107, 109 and the first and second damper members 111, 112 can be injection molded by virtue of the first and second single piece design as mentioned above, problems may occur regarding deformation, shrinkage and/or warping phenomena during the injection molding processes. To address these injection molding issues, an embodiment is provided wherein the speaker device 101 further comprises a first damper support part 113 extending between the first damper member 111 and the first frame part 102*a*, and wherein a second damper support part 114 extends between the second damper member 112 and the second frame part 102*b*. The first and second damper support parts 113, 114 prevent unwanted deformation, shrinkage, and/or warping during injection molding, so that the first and second damper members 111, 112 maintain a required shape and resiliency after the injection molding processes have been completed.

Figure 4:
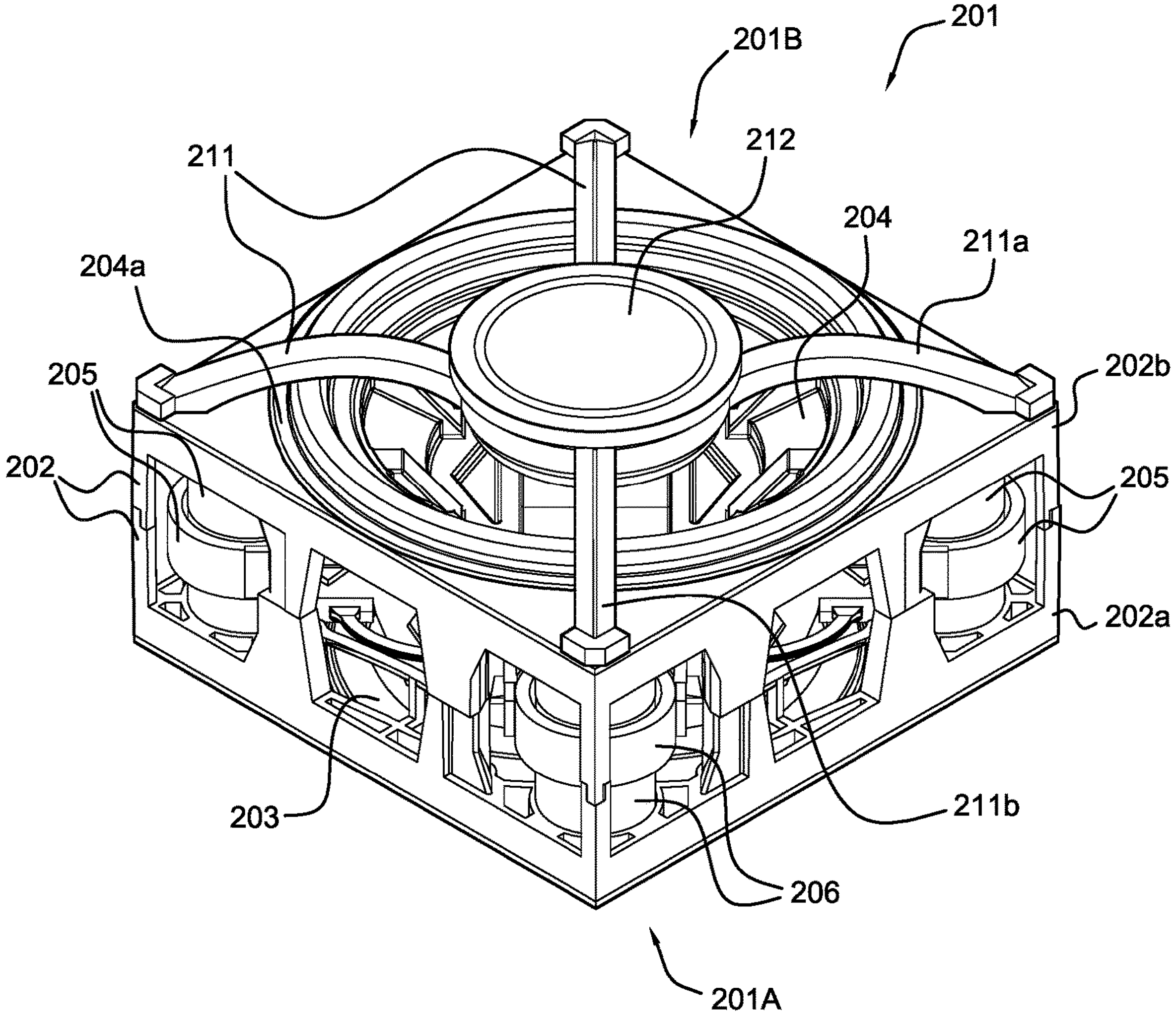
FIG. 4 shows a three dimensional view of a speaker device according to another embodiment of the present invention.
Figure 5:
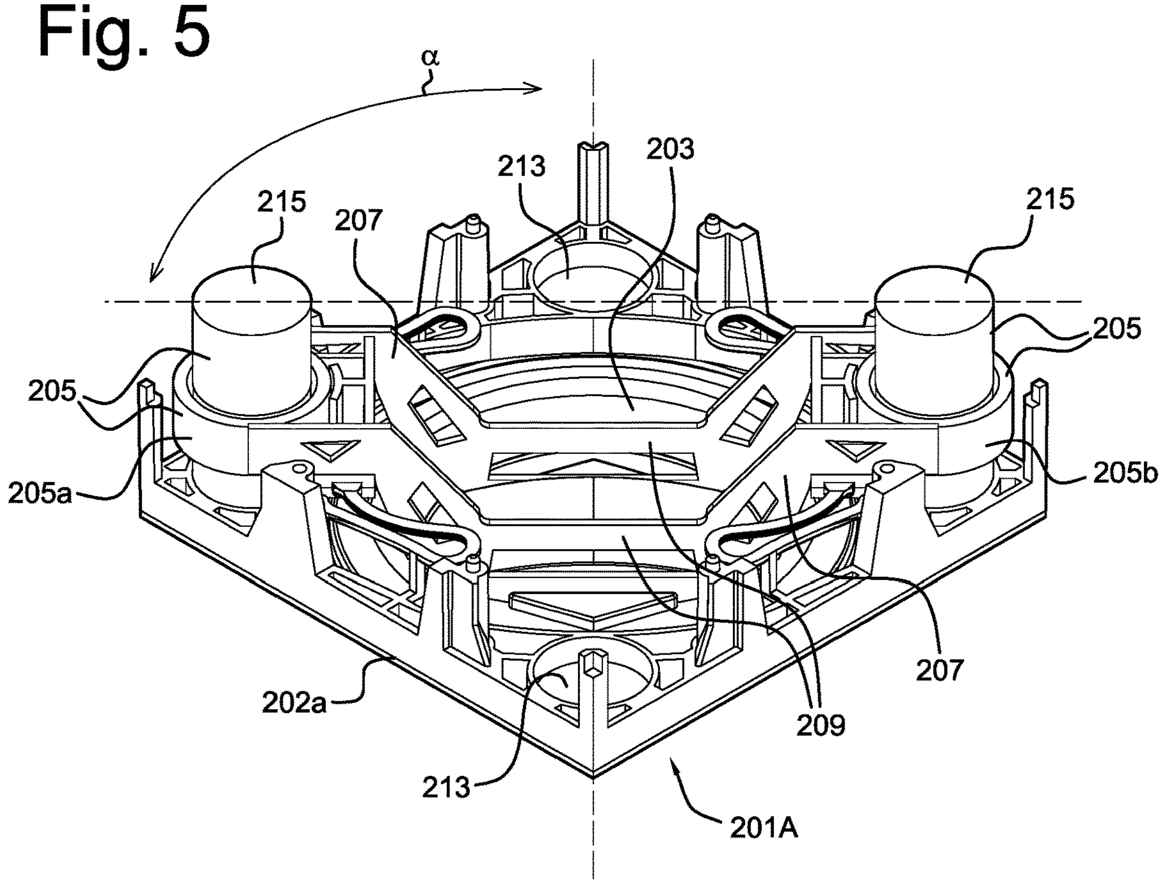
FIG. 5 shows a three dimensional view of a first frame part of a speaker device according to another embodiment of the present invention.
Figure 6:
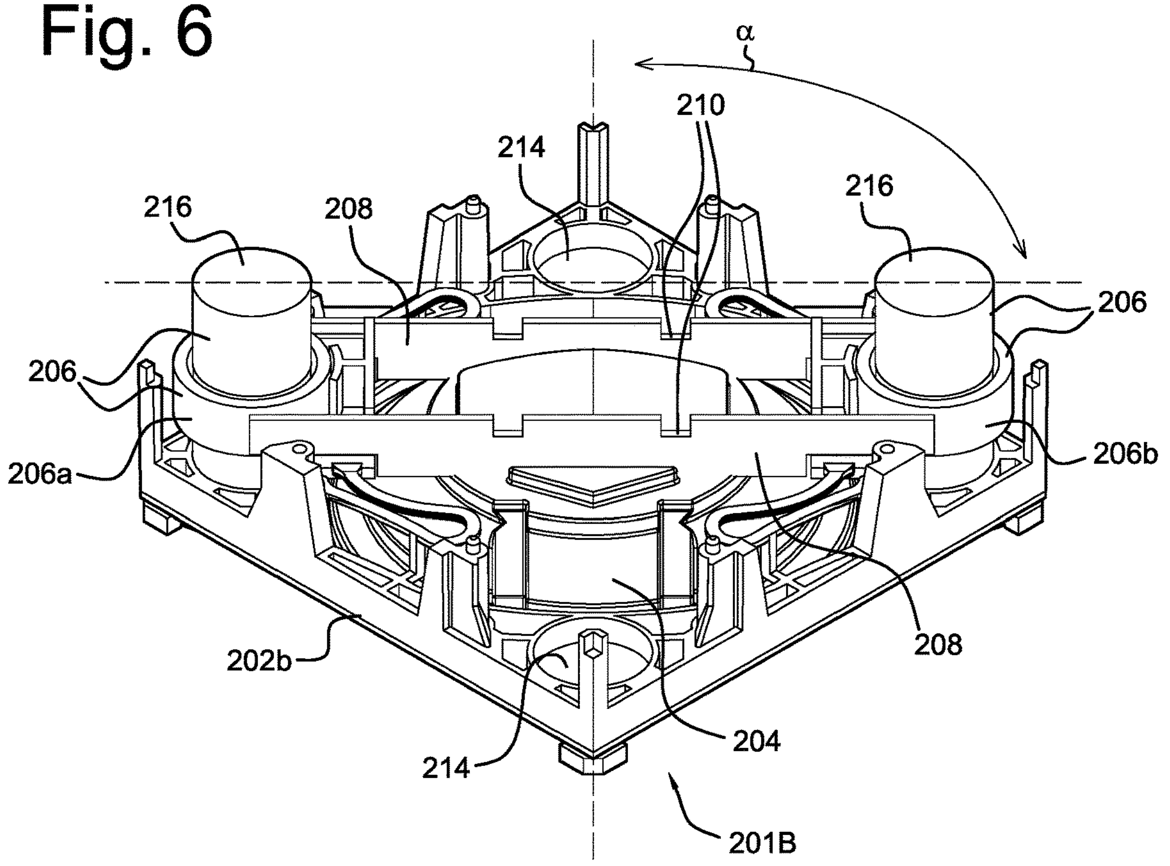
FIG. 6 shows a three dimensional view of a second frame part of a speaker device according to another embodiment of the present invention.
Figure 7:
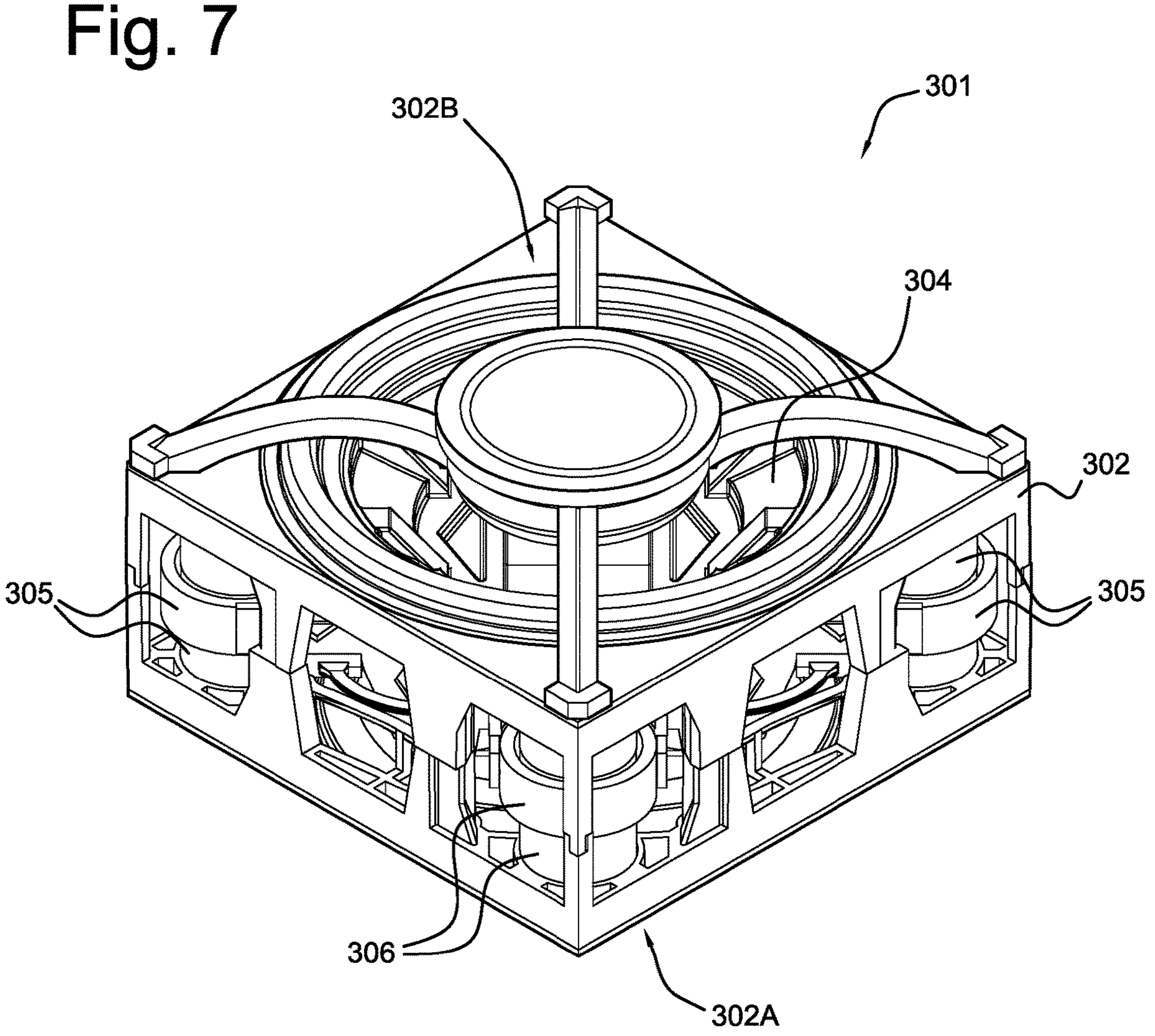
FIG. 7 shows a three dimensional view of a speaker device according to another embodiment of the present invention.
Figure 8:
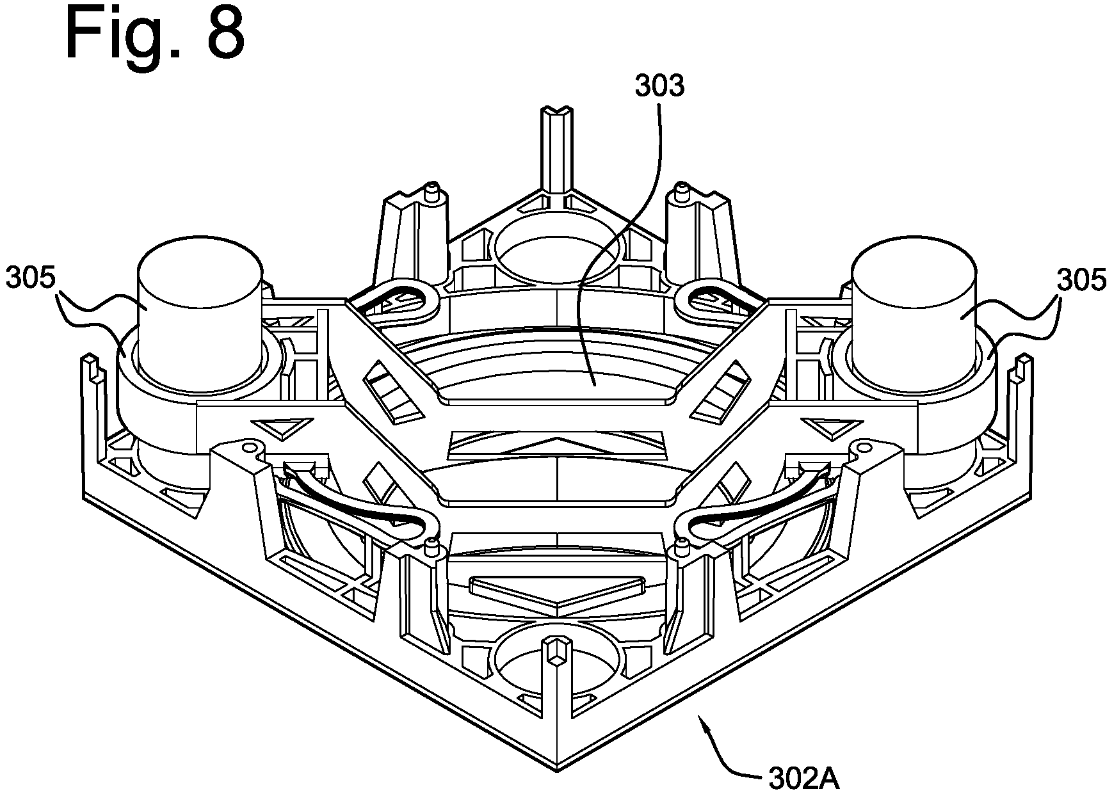
FIG. 8 shows a three dimensional view of a first frame side of a speaker device according to an embodiment of the present invention.
Figure 9:
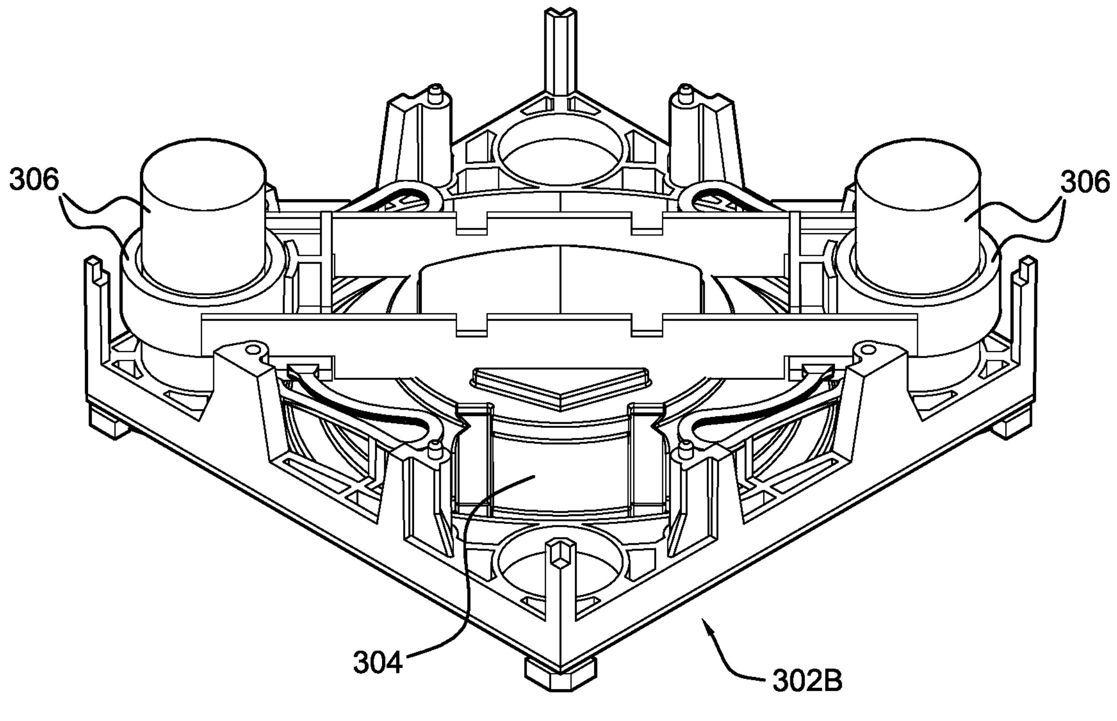
FIG. 9 shows a three dimensional view of a second frame side of a speaker device according to an embodiment of the present invention.

Referring to the FIGS. 4 to 6, a speaker device 201 is depicted comprising a first side 201*a* and a spaced apart opposing second side 201*b*. A frame 202 is provided as well as a first diaphragm 203 and a second diaphragm 204, wherein the first diaphragm 203 is mounted in the frame 202 at the first side 201*a* and the second diaphragm 204 is mounted in the frame 202 at the second side 201*b*. A first speaker driver 205 is provided and configured to drive the first diaphragm 203 and a second speaker driver 206 is provided and configured to drive the second diaphragm 204, wherein the first diaphragm 203 and the second diaphragm 204 have different shapes.

By virtue of the first and second diaphragms 203, 204 having difference shapes allows for good sound range and performance whilst providing a small profile (e.g. thickness) to the speaker device 201. In particular, the first diaphragm 203 may have a first shape to meet first sound requirements and wherein the second diaphragm 204 may have a second shape to meet second sound requirements, the first and second shape being different to meet the first and second sound requirements respectively. Most advantageously, as will be discussed in further detail below, the different shapes for the first and second diaphragms 203, 204 also allow for a secondary speaker member 212, e.g. a tweeter, to be fitted next/adjacent to the first or second diaphragm 203, 204 in compact manner if so desired.

In the exemplary embodiment, the first diaphragm 203 may be a substantially flat diaphragm and wherein the second diaphragm 204 may be a concave diaphragm. The flat and concave diaphragms 203, 204 may be configured to meet different sound requirements whilst maintaining a low profile, such as a thickness, for the speaker device 201. Since the first diaphragm 203 may be substantially flat, this provides more space inside the speaker device 201 for receiving the concave second diaphragm 204. Furthermore, such a concave second diaphragm 204 provides a concave space in which at least in part the aforementioned secondary speaker member 212 may be received to further reduce the profile of the speaker device 201.

In an advantageous embodiment, a first diaphragm support member 207 is provided and connected to the first speaker driver 205 and extends along the first diaphragm 203 for support thereof. A second diaphragm support member 208 is further provided and connected to the second speaker driver 206 and extends along the second diaphragm 204 for support thereof. As shown, the first diaphragm support member 207 and the second diaphragm support member 208 are rotationally offset at an angle ($\alpha$) between 45° and 90° as measured in a plane parallel to the first or the second side 201*a*, 201*b*.

In another advantageous embodiment, the first speaker driver 205 and the second speaker driver 206 may be arranged in a same plane, which also facilities a reduction of the profile (e.g. thickness) of the speaker device 201.

As can be inferred from FIGS. 5 and 6, the first diaphragm support member 207 and the second diaphragm support member 208 may be arranged in crosswise manner to minimize interference between the first and second diaphragm support members 207, 208 as well as the first and second speaker drivers 205, 206. Such a crosswise arrangement of the first and second diaphragm support members 207, 208 allows for a much smaller profile or form factor, both in width, length and/or thickness of the speaker device 201.

It is worth noting that the first diaphragm support member 207 in FIG. 5 and the second diaphragm support member 208 in FIG. 6 are shown to have a similar orientations, but from FIG. 4 it can be inferred that the first and second diaphragm support members 207, 208 are rotationally offset at the aforementioned angle (α) in an assembled state of the speaker device 201. As will be discussed further below, the frame 202 may comprise a first frame part 202*a* and a second frame part 202*b*, the first frame part 202*a* being provided with one or more first cavities 213 to receive at least in part the second speaker driver 206, and wherein the second frame part 202*b* is provided with one or more second cavities 214 to receive at least in part the first speaker driver 205. In the assembled state of the speaker device 201, the first and second diaphragm support members 207, 208 will then be arranged in crosswise manner as mentioned above.

In an advantageous embodiment, the first diaphragm support member 207 comprises one or more recessed center sections 209 extending along the first diaphragm 203 and wherein the second diaphragm support member 208 is movably received in the one or more recessed center sections 209. In this way it is possible to further lower/reduce the profile (e.g. thickness) of the speaker device 201 as the first diaphragm support member 207 provides space for the second diaphragm support member 208 to movably cross the first diaphragm support member 207 without interference whilst allowing the spacing between the first and second diaphragm 203, 204. i.e. the first and second side 201*a*, 201*b*, to be minimized.

In an advantageous embodiment, the second diaphragm support member 208 comprises one or more cut-outs 210 for movably receiving the first diaphragm support member 207. As can be inferred from FIGS. 5 and 6, the one or more cut-outs 210 provide room for the second diaphragm support member 208 to movably cross the first diaphragm support member 207 without interference in a space saving manner.

It is worth noting that the one or more recessed center sections 209 of the first diaphragm support member 207 and/or the one or more cut-outs 210 of the second diaphragm support member 208 also ensure that sufficient travel of the first and second diaphragms 203, 204 is possible when in use for achieving optimal performance of the speaker device 201.

In an embodiment as depicted in FIGS. 5 and 6, the first speaker driver 205 may comprise two spaced apart, e.g. opposing, moveable first driver parts 205*a*, 205*b* and wherein the first diaphragm support member 207 extends between the two first driver parts 205*a*, 205*b*. Likewise, the second speaker driver 206 may comprises two spaced apart, e.g. opposing, moveable second driver parts 206*a*, 206*b* and wherein the second diaphragm support member 208 extends between the two second driver parts 206*a*, 206*b*.

In this embodiment the first diaphragm 203 is driven through the first diaphragm support member 207 which is connected between and to the opposing first driver parts 205*a*, 205*b*. In this way driving forces of the first driver parts 205*a*, 205*b* are optimally distributed across the first diaphragm 203. Likewise, the second diaphragm 204 is driven through the second diaphragm support member 208 which is connected between and to the opposing second driver parts 206*a*, 206*b*. In this way driving forces of the second driver parts 206*a*, 206*b* are optimally distributed across the second diaphragm 204.

In an exemplary embodiment, the first diaphragm support member 207 and the second diaphragm support member 208 are rotationally offset at an angle (α) of (substantially) 90° degrees. In this embodiment the first and second diaphragm support members 207, 208 may be viewed as being arranged substantially perpendicular as measured in a plane parallel to the first or second side 201*a*, 201*b*. In this way both a width and a length of the speaker device 201 as measured in this plane can be both minimized, for example, to achieve a compact square profile of the speaker device 201.

In a further embodiment, the speaker device 201 further comprises a first diaphragm assembly and a second diaphragm assembly. The first diaphragm assembly comprises the first diaphragm 203, the two moveable first driver parts 205*a*, 205*b* and the first diaphragm support member 207, and the second diaphragm assembly comprises the second diaphragm 204, the two moveable second driver parts 206*a*, 206*b* and the second diaphragm support member 208. Then, a weight of the first diaphragm assembly is substantially equal to a weight of the second diaphragm assembly, thereby allowing resonance and vibration free operation of the speaker device 201. It is noted that the equality of weight relates to the combination of moving parts in operation. In one embodiment, all three components of the first and second diaphragm assembly are substantially equal in weight. In a further embodiment, a higher or lower weight of e.g. the first diaphragm 203 as compared to the second diaphragm 204 can be offset by a lower or higher weight, respectively, of the first diaphragm support member 207 as compared to the second diaphragm support member 208.

Referring to FIG. 4, in an embodiment a support structure 211 is provided and arranged on the second side 201*b* and wherein a secondary speaker member 212 is mounted to the support structure 211, wherein the secondary speaker member 212 is supported next/adjacent to the second diaphragm 204 spaced apart therefrom. The secondary speaker member 212 may further improve dynamic sound range and performance of the speaker device 201. In an exemplary embodiment, the secondary speaker member 212 is a tweeter. The support structure 211 allows the secondary speaker member 212 to be arranged close to the second diaphragm 204 whilst maintaining a compact profile, such as a thickness, of the speaker device 201. As mentioned earlier, the secondary speaker member 212 may be sized, shaped and/or arranged to also improve weight distribution of the speaker device 201 to minimize unwanted resonance and vibrations.

To further reduce the profile of the speaker device 201, an exemplary embodiment is provided wherein the second diaphragm 204 is a concave diaphragm providing a concave space, wherein the secondary speaker member 212 is at least in part arranged in the concave space. The concave space is understood to protrude/project into the speaker device 201. In this embodiment the secondary speaker member 212 is at least in part received in the concave space so that an even more compact design of the speaker device 201 is obtained.

It is worth noting that the one or more recessed center sections 209 of the first diaphragm support member 207 provide more internal space in the speaker device 201 for a concave second diaphragm 204, because the one or more recessed center sections 209 are able to receive in a nested manner at least in part the concave second diaphragm 204 and the rotationally offset second diaphragm support member 208 supporting the concave second diaphragm 204.

In the exemplary embodiment of FIG. 4, the support structure 211 comprises a plurality of support legs 211*a*, 211*b* peripherally mounted along the second side 201*b* around the second diaphragm 204 and extending toward the secondary speaker member 212. Each of the support legs 211*a*, 211*b* is able to extend from a perimeter of the second side 201*b* around the second diaphragm 204 to the secondary speaker member 212, which is then connected to each of the support legs 211*a*. 211*b*. In this way the plurality of support legs 211*a*, 211*b* allow the secondary speaker member 212 to be suspended proximal to the second diaphragm 204 in space saving manner.

When the second diaphragm 204 is a concave diaphragm providing the concave space as mentioned earlier, then an advantageous embodiment is provided wherein each of the support legs 211*a*, 211*b* is an arched support leg comprising an arched section projecting away from the second side 201*b*. The plurality of arched support legs 211*a*, 211*b* facilitate the arrangement of the secondary speaker member 212 at least in part into the concave space without interfering with the second diaphragm 204, e.g. by avoiding a diaphragm rim 204*a* of the second diaphragm 204. The plurality of arched support legs 211*a*, 211*b* thus allow for an even more compact design of the speaker device 201.

Note that in an embodiment the first diaphragm support member 207 is configured to provide sufficient rigidity for support of a substantially flat first diaphragm 203 as mentioned above. In this embodiment, a depth of the one or more recessed center sections 209 can be increased to movably receive the second diaphragm support member 208. Such an increase in depth of the one or more recessed center sections 209 will be possible as a substantially flat first diaphragm 203 avoids a concave protrusion into the speaker device 201.

As mentioned above, the frame 202 may comprise a first frame part 202*a* and second frame part 202*b*, the first frame part 202*a* being provided with one or more first cavities 213 to receive at least in part the second speaker driver 206, and wherein the second frame part 202*b* is provided with one or more second cavities 214 to receive at least in part the first speaker driver 205. In the assembled state of the speaker device 201, the first and second diaphragm support members 207, 208 will be rotationally offset (crosswise) as inferred from FIGS. 4 to 6.

In an embodiment, the first speaker driver 205 may comprise two spaced apart first magnet parts 215 which may be received in two spaced apart corresponding second cavities 214 in the second frame part 202*b* of the frame 202. Likewise, the second speaker driver 206 may comprise two spaced apart second magnet parts 216 which may be received in two spaced apart corresponding first cavities 213 in the first frame part 202*a* of the frame 202. The aforementioned two spaced apart moveable first driver parts 205*a*, 205*b*, each comprising e.g. a coil, may be movably arranged along the corresponding two spaced apart first magnet parts 215. The two spaced apart moveable second driver parts 206*a*, 206*b*, each comprising e.g. a coil, may be movably arranged along the corresponding two second magnet parts 216.

Referring to FIGS. 7 to 11, a speaker device 301 is provided and comprises a frame 302 having a first frame side 302*a* and a spaced apart opposing second frame side 302*b*. A first diaphragm 303 is mounted in the frame 302 at the first frame side 302*a* and an opposing second diaphragm 304 is mounted in the frame 302 at the second frame side 302*b*. In an exemplary embodiment, and for ease of understanding, the first and second frame sides 302*a*, 302*b* may be viewed as opposing, spaced apart front and back surfaces (or vice versa) respectively of the speaker device 301. It will be understood that the first diaphragm 303 and the second diaphragm 304 may also be called first and second membranes 303, 304 arranged for producing sound.

The speaker device 301 further comprises a first speaker driver 305 configured to drive the first diaphragm 303 and a second speaker driver 306 configured to drive the second diaphragm 304, i.e. the first and second speaker driver 305, 306 are configured for moving the first and second diaphragm 303, 304 for sound production.

Figure 10:
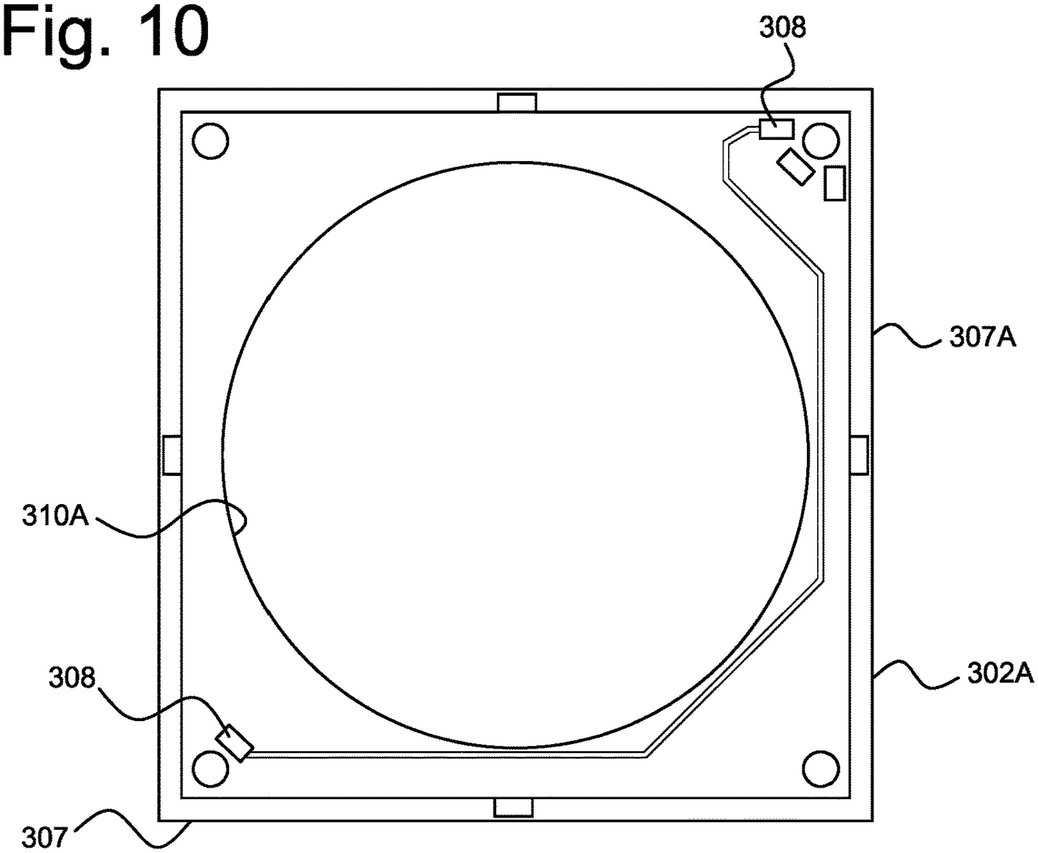
FIGS. 10 and 11 show a PCB as used in a speaker device according to an embodiment of the present invention.
Figure 11:
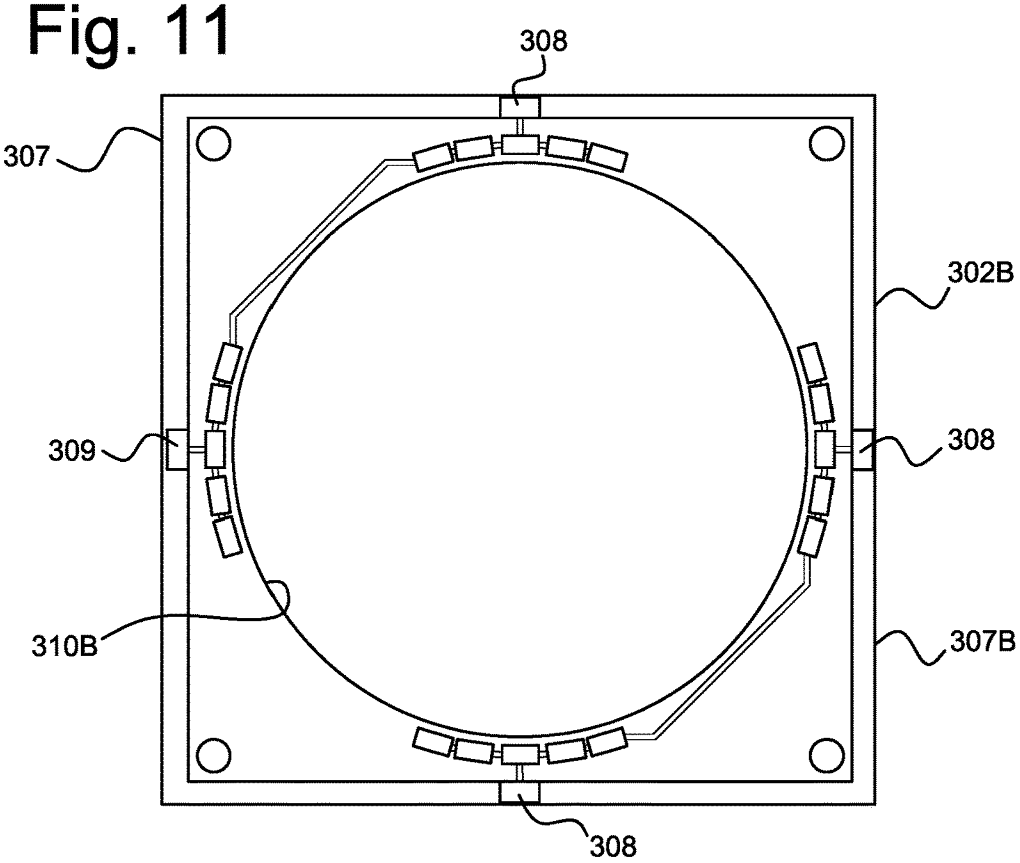

As depicted in FIGS. 10 and 11, a Printed Circuit Board 307, or PCB in short, is electrically connected to the first and second speaker driver 305, 306 and wherein the PCB 307 provides one or more positions 308 for connecting the speaker device 301 to an external device. Furthermore, the first frame side 302*a* and/or the second frame side 302*b* of the frame 302 comprises the PCB 307.

Since the first frame side 302*a* and/or the second frame side 302*b* comprise the PCB 307 allows for a compact electrical arrangement for controlling the first and second speaker drivers 305, 306 as well as connecting the speaker device 301 to an external device. The PCB 307 further allows for compact and reliable routing of electrical connections between various electrical components of the speaker device 301. Moreover, the PCB 307 increases structural rigidity of the first and/or the second frame side 302*a*, 302*b* considerably and as such rigidity of the frame 302 is increased, thereby reducing resonance and other unwanted vibrations of the speaker device 301 that could potentially reduce overall performance.

In an embodiment, the PCB 307 comprises sensor electronics and/or or integrated chips. That is, in this embodiment, the PCB 307 allows various sensor electronics and/or integrated chips to be housed in the speaker device 301 in a space saving manner, where loose electrical wiring inside the speaker device 301 is minimized. In an exemplary embodiment, the sensor electronics and/or the integrated chips comprise at least one of: a temperature sensor, an accelerometer, a gyroscope, a magnetometer, a proximity sensor, a microphone, a frequency filtering element, a microprocessor, a barometer, a thermometer, an air humidity sensor. Therefore, in this embodiment the PCB 7 allows for high integration of many different types of electronic components and combinations thereof whilst improving structural rigidity of the speaker device 1 also.

To further improve structural rigidity and safety of the speaker device 301, in an exemplary embodiment the PCB 307 is made of a metal and/or Flame Retardant/Resistant materials, FR, such as FR-2, FR-4.

Various electronic components as mentioned above and combinations thereof may be provided on the PCB 307 in space saving manner. To that end there is provided an embodiment wherein the PCB 307 comprises a plurality of layers. Each of the layers may be utilized to accommodate one or more electronic components and may also be used for routing electrical connections between various electrical components.

As mentioned above, the first frame side 302*a* and/or the second frame side 302*b* comprise the PCB 307 to provide a compact electrical arrangement for controlling the first and second speaker drivers 305, 306 as well as connecting the speaker device 301 to an external device, e.g. one or more external devices. At the same time, the PCB 307 increases structural rigidity of the first and/or the second frame side 302*a*, 302*b* and as such the overall rigidity of the frame 302. Increasing structural rigidity in this way maintains a compact form factor of the speaker device 301 yet allows significant reduction of resonance and other unwanted vibrations of the speaker device 301 that could potentially reduce overall performance thereof.

The increased rigidity of the first and second frame sides 302*a*, 302*b* can be increased in an advantageous embodiment wherein the PCB 307 is integrally formed, e.g. in unitary manner, with the first frame side 302*a* and/or the second frame side 302*b*. That is, as shown, the first and/or the second frame sides 302*a*, 302*b* may be provided as the PCB 307 itself, so wherein the PCB 307 defines the front and/or back surface of the speaker device 301. In this way the number of structural components is minimized whist still providing all necessary electrical components for the speaker device 301.

In an alternative embodiment, the PCB 307 may be mechanically bonded to the first and/or second frame sides 302*a*, 302*b*. In this particular embodiment the first and/or second frame sides 302*a*, 302*b* may be provided as dedicated structural side/surface plates on which the PCB 307 is mechanically bonded. The first and second frame sides 302*a*, 302*b* may then be made of a material that maximizes structural rigidity. In another alternative embodiment, the PCB 307 is chemically bonded to the first and/or second frame side 302*a*, 302*b*, e.g. by means of an adhesive. This embodiment also allows the first and/or second frame sides 302*a*, 302*b* to be provided as dedicated structural side/surface plates to maximize structural rigidity and on which the PCB 307 is chemically bonded.

As depicted in FIG. 11, the PCB 307 may provide one or more further positions 309 for electrically connecting one or more external electrical components, e.g. external speakers, to the PCB 307. The one or more further positions 309 may be arranged along a perimeter of the first and/or second frame sides 302*a*, 302*b*. This also applies to the one or more positions 308 as mentioned earlier, which in an embodiment may also be arranged along a perimeter of the first and/or second frame sides 302*a*, 302*b*.

It is further shown in FIGS. 7 to 11 that in an embodiment the PCB 307 may comprise a first PCB part 307*a* arranged on the first frame side 302*a* and a second PCB part 307*b* on the second frame side 302*b*, wherein the first and second PCB part 307*a*, 307*b* are electrically connected along the frame 302. The first and second PCB part 307*a*, 307*b* each provide structural rigidity to their respective first and second frame sides 302*a*, 302*b* and incorporate various electrical components in a space saving manner. In an embodiment, the first and second PCB parts 307*a*, 307*b* are integrally formed, e.g. in unitary manner, with the first and second frame sides 302*a*, 302*b* to simultaneously provide structural rigidity to the frame 302, i.e. the speaker device 301, and a reduction in the number of components. In alternative embodiments, the first and second PCB parts 307*a*, 307*b* may be mechanically and/or chemically bonded to their respective first and second frames sides 302*a*, 302*b*, thereby further increasing structural rigidity but to also allow for dedicated first and second frame sides/panels 302*a*, 302*b* for achieving maximum rigidity of the speaker device 301.

In FIGS. 10 and 11 it is further shown that the PCB 307 may comprise one or more openings 310*a*, 310*b* through which the first and/or second diaphragms 303, 304 extend. In this embodiment, depending which first and/or second frame side 302*a*, 302*b* comprises the PCB 307, one or more openings 310*a*, 310*b* are provided in which the first and/or second diaphragms 303, 304 may be mounted. Therefore, the PCB 307 may be seen as a first and/or second frame side/plate 302*a*, 302*b* with respective openings 310*a*. 310*b* for accommodating the first and/or second diaphragms 303, 304. In the exemplary embodiments depicted, the PCB 307 may comprise a first PCB part 307*a* on the first frame side 302*a* and a second PCB part 307*b* on the second frame side 302*b*, wherein the first PCB part 307*a* comprises a first opening 310*a* for accommodating the first diaphragm 303 and wherein the second PCB part 307*b* comprises a second opening 310*b* for accommodating the second diaphragm 304. The first and second PCB parts 307*a*, 307*b* are electrically connected along the frame 302. The one or more positions 308 and optionally the one or more further positions 309 may be arranged around the first and/or second opening 310*a*, 310*b* and along the perimeter of the first and/or second frame sides 302*a*, 302*b* for optimal use of space and ease of connectivity to external devices.

As mentioned earlier, the speaker device 101, 201, 301 of the present invention allows for the first diaphragm 103, 203, 303 and the second diaphragm 104, 204, 304 to have different shapes, thereby allowing for good sound range and performance whilst providing a small or compact profile to the speaker device 101, 201, 301. This was explained in light of FIGS. 4 to 6 but equally applies to the embodiments of the speaker device 101, 303 shown in FIGS. 1 to 3 and FIGS. 7 to 11.

Figure 12A:
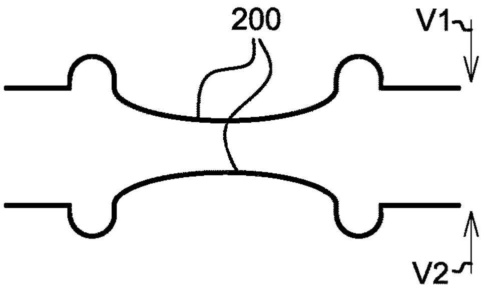
Figure 12B:
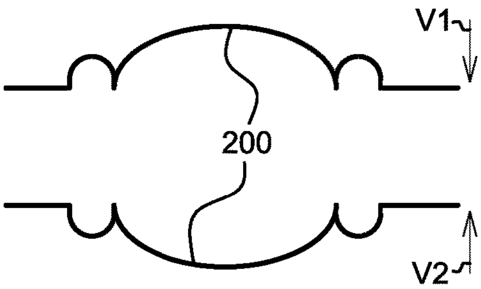
Figure 12C:
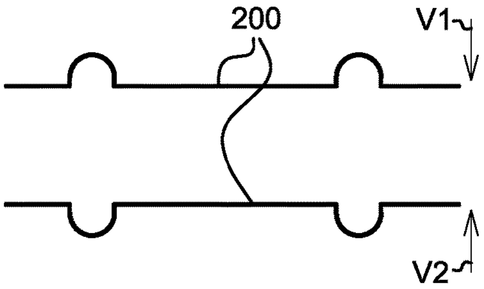

To further clarify what such different shapes mean, FIGS. 12A to 12C each illustrate an example of two opposing diaphragms 200 that may be found in conventional dual diaphragm speaker devices in which individual diaphragms 200 have substantially the same shape when viewed from the indicated viewing directions V1 and V2. In particular, FIG. 12A depicts similarly shaped diaphragms 200 that are both concave when viewed from the indicated directions V1 and V2. Alternatively, FIG. 12B depicts similarly shaped diaphragms 200 that are both convex when viewed from the indicated viewing directions V1 and V2. FIG. 12C depicts similarly shaped diaphragms 200 that are both substantially flat when viewed from the indicated viewing directions V1 and V2.

Figure 13A:
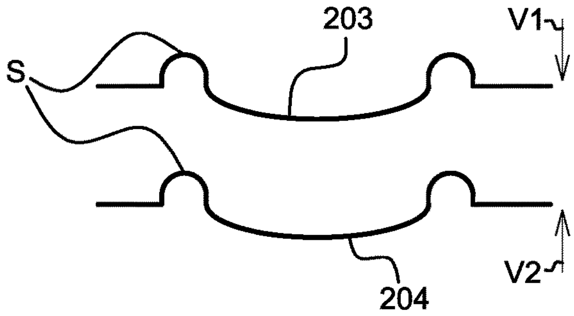
FIGS. 13A-13E show embodiments of differently shaped opposing diaphragms as used in a speaker device according to embodiments of the present invention.

In contrast to the FIG. 12A to 12C, FIGS. 13A to 13E show cross sectional embodiments of differently shaped diaphragms 203, 204 of the speaker device of the present invention. In particular, FIG. 13A depicts a cross section of the first diaphragm 203 and the second diaphragm 204 that are both arched, but wherein the first diaphragm 203 has a concave shape when viewed from the viewing direction V1 and the second diaphragm 204 has a convex shape when viewed from the viewing direction V2. In this embodiment, a surround portion S of the first diaphragms 203 is convex when viewed from the viewing direction V1 and a surround portion S of the diaphragm 204 is concave when viewed from the viewing direction V2.

Figure 13B:
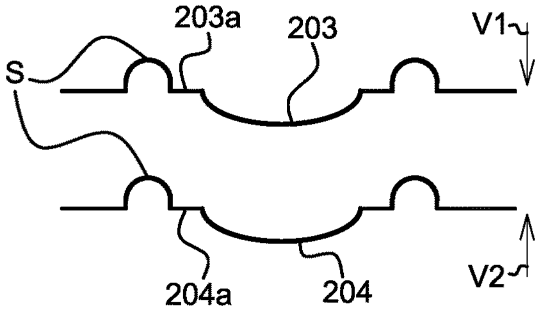

FIG. 13B shows a cross section of the first diaphragm 203 and the second diaphragm 204 that are both arched, but wherein the first diaphragm 203 has a concave shape when viewed from the viewing direction V1 and the second diaphragm 204 has a convex shape when viewed from the viewing direction V2. Furthermore, the first and second diaphragms 203, 204 each comprise a substantially flat edge portion 203*a*, 204*a* that connects to the corresponding surround portion S. The surround portion S of the first diaphragms 203 is convex when viewed from the viewing direction V1 whereas the surround portion S of the second diaphragm 204 is concave when viewed from the viewing direction V2.

Figure 13C:
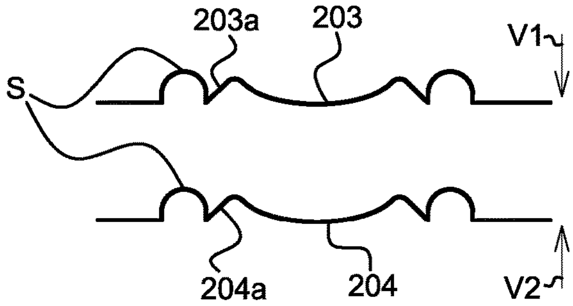

FIG. 13C shows a cross section of the first diaphragm 203 and the second diaphragm 204 that are both arched, but wherein the first diaphragm 203 has a concave shape when viewed from the viewing direction V1 and the second diaphragm 204 has a convex shape when viewed from the viewing direction V2. In this embodiment, the first diaphragm 203 comprises a convex edge portion 203*a*, when viewed from the viewing direction V1, connecting to the corresponding surround portion S. The second diaphragm 204 comprises a concave edge portion 204*a*, when viewed from the viewing direction V2, connecting to the corresponding surround portion S. The surround portion S of the first diaphragms 203 is convex when viewed from the viewing direction V1 whereas the surround portion S of the second diaphragm 204 is concave when viewed from the viewing direction V2.

Figure 13D:
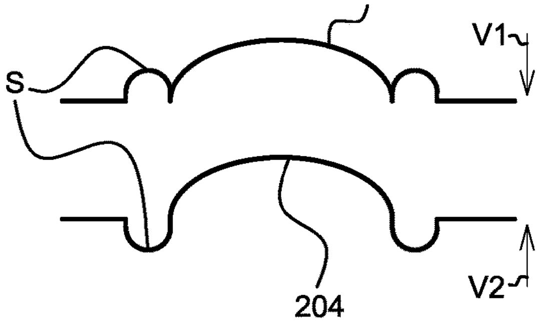

FIG. 13D shows a cross section of the first diaphragm 203 and the second diaphragm 204 that are both arched, but wherein the first diaphragm 203 has a convex shape when viewed from the viewing direction V1 and the second diaphragm 204 has a concave shape when viewed from the viewing direction V2. In this embodiment, the surround portion S of the first diaphragm 203 is convex when viewed from the viewing direction V1 and the surround portion S of the diaphragm 204 is also convex when viewed from the viewing direction V2.

Figure 13E:
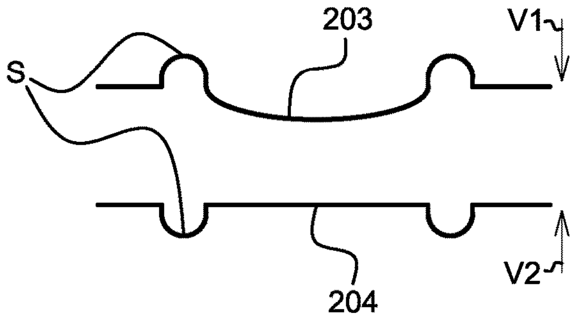

FIG. 13E shows a cross section of an arched first diaphragm 203 and a substantially flat second diaphragm 204. The first diaphragm 203 has a concave shape when viewed from the viewing direction V1. Like the embodiment shown in FIG. 13D, the surround portion S of the first diaphragms 203 is convex when viewed from the viewing direction V1 and wherein the surround portion S of the second diaphragm 204 is also convex when viewed from the viewing direction V2.

The embodiments of FIG. 13A to 13E show differently shaped first and second diaphragms 203, 204 when viewed in the indicated viewing directions V1, V2 respectively. Such different shapes allow the first and second diaphragms 203, 204 to be arranged closer to each other such that a tighter nesting of the first and second diaphragms 203, 204 is achieved.

The present invention has been described above with reference to a number of exemplary embodiments as shown in the drawings. Modifications and alternative implementations of some parts or features are possible, and are included in the scope of protection as defined in the appended claims. Moreover, all features of the speaker device 101, the speaker device 102, and the speaker device 103 described above may be combined in a single speaker device.

In view of the above disclosure, the present invention and aspects thereof may now be defined and summarized by the following embodiments:

Embodiment A1. A speaker device (101, 201, 301) comprising a frame (102, 202, 302), a first diaphragm (103, 203, 303) and a second diaphragm (104, 204, 304), wherein the frame (102, 202, 302) comprises a first frame part (102*a*, 202*a*) on which the first diaphragm (103, 203, 303) is mounted and an opposing second frame part (102*b*, 202*b*) on which the second diaphragm (104, 204, 304) is mounted: a first speaker driver (105, 205, 305) configured to drive the first diaphragm (103, 203, 303) and a second speaker driver (106, 206, 306) configured to drive the second diaphragm (104, 204, 304): the first speaker driver (105, 205, 305) comprises a movable first coil bracket (107) and a first diaphragm connecting member (108) connected to the first diaphragm (103, 203, 303) and the first coil bracket (107); the second speaker driver (106, 206, 306) comprises a movable second coil bracket (109) and a second diaphragm connecting member (110) connected to the second diaphragm (104, 204, 304) and the second coil bracket (109): a resilient first damper member (111) connecting the first coil bracket (107) to the first frame part (102*a*, 202*a*) and a resilient second damper member (112) connecting the second coil bracket (109) to the second frame part (102*b*, 202*b*); wherein the first frame part (102*a*, 202*a*), the first coil bracket (107) and the first damper member (111) form a first single piece integrally formed unitary component, and wherein the second frame part (102*b*, 202*b*), the second coil bracket (109) and the second damper member (112) form a second single piece integrally formed unitary component.

Embodiment A2. The speaker device (101) according to embodiment A1, wherein the first and second damper members (111, 112) each have a thickness smaller than a thickness of the first and second frame part (102*a*, 102*b*) respectively.

Embodiment A3. The speaker device (101) according to embodiment A1 or A2, wherein the first coil bracket (107) and the first damper member (111) form a side-by-side arrangement in a same first plane, and wherein the second coil bracket (109) and the second damper member (112) form a side-by-side arrangement in a same second plane.

Embodiment A4. The speaker device (101) according to any of embodiments A1-A3, wherein the first damper member (111) comprise at least two resilient first damper legs (111*a*, 111*b*) each of which connects the first coil bracket (107) to the first frame part (102*a*): wherein the second damper member (112) comprises at least two resilient second damper legs (112*a*, 112*b*) each of which connects the second coil bracket (109) to the second frame part (102*b*).

Embodiment A5. The speaker device (101) according to any of embodiments A1-A4, wherein the first and second frame parts (102*a*, 102*b*), the first and second damper members (111, 112), and the first and second coil brackets (107, 109) each comprise one or more walls, wherein each wall has a wall thickness between 0.3 mm and 5 mm.

Embodiment A6. The speaker device (101) according to embodiment A5, wherein the one or more walls of each of the first and second damper members (111,112) have a minimum wall thickness of 0.3 mm.

Embodiment A7. The speaker device (101) according to embodiment A5 or A6, wherein the one or more walls of the first and second frame parts (102*a*, 102*b*) and the one or more walls of each of the first and second coil brackets (107, 109) have a maximum wall thickness of 5 mm.

Embodiment A8. The speaker device (101) according to any of embodiments A1-A7, further comprising a first damper support part (113) extending between the first damper member (111) and the first frame part (102*a*), and a second damper support part (114) extending between the second damper member (112) and the second frame part (102*b*).

Embodiment A9. The speaker device (101) according to any of embodiments A1-A8, wherein the first and second frame parts (102*a*, 102*b*) each comprise a plurality of cavities (115) each of which is arranged to receive a part of the first and second speaker drivers (105, 106).

Embodiment A10. The speaker device (101) according to any of embodiments A1-A9, wherein the first speaker driver (105) and the second speaker driver (106) are configured to drive the first diaphragm (103) and the second diaphragm (104), respectively, in mutually opposing directions.

Embodiment B1. A speaker device (201) comprising a first side (201*a*) and a spaced apart opposing second side (201*b*), a frame (202), a first diaphragm (203) and a second diaphragm (204), wherein the first diaphragm (203) is mounted in the frame (202) at the first side (201*a*) and the second diaphragm (204) is mounted in the frame (202) at the second side (201*b*): a first speaker driver (205) configured to drive the first diaphragm (203) and a second speaker driver (206) configured to drive the second diaphragm (204), and wherein the first diaphragm (203) and second diaphragm (204) have different shapes.

Embodiment B2. The speaker device (201) according to embodiment B1, wherein the first diaphragm (203) is a substantially flat diaphragm and wherein the second diaphragm (204) is a concave diaphragm.

Embodiment B3. The speaker device (201) according to embodiment B1 or B2, further comprising a first diaphragm support member (207) connected to the first speaker driver (205) and extending along the first diaphragm (203) for support thereof, and a second diaphragm support member (208) connected to the second speaker driver (206) and extending along the second diaphragm (204) for support thereof, and wherein the first diaphragm support member (207) and the second diaphragm support member (208) are rotationally offset at an angle ($\alpha$) between 45° and 90° as measured in a plane parallel to the first or the second side (201*a*, 201*b*).

Embodiment B4. The speaker device (201) according to embodiment B3, wherein the first diaphragm support member (207) comprises one or more recessed center sections (209) extending along the first diaphragm (203) and wherein the second diaphragm support member (208) is movably received in the one or more recessed center section (209).

Embodiment B5. The speaker device (201) according to embodiment B3 or B4, wherein the second diaphragm support member (208) comprises one or more cut-outs (210) for movably receiving the first diaphragm support member (207).

Embodiment B6. The speaker device (201) according to any of embodiments B3-B5, wherein the first speaker driver (205) comprises two spaced apart moveable first driver parts (205*a*, 205*b*) and wherein the first diaphragm support member (207) extends between the two first driver parts (205*a*, 205*b*), and wherein the second speaker driver (206) comprises two spaced apart moveable second driver parts (206*a*, 206*b*) and wherein the second diaphragm support member (208) extends between the two second driver parts (206*a*, 206*b*).

Embodiment B7. The speaker device (201) according to embodiment B6, wherein the first diaphragm support member (207) and the second diaphragm support member (208) are rotationally offset at an angle ($\alpha$) of 90° degrees.

Embodiment B8. The speaker device (201) according to embodiment B6 or B7, further comprising a first diaphragm assembly and a second diaphragm assembly, the first diaphragm assembly comprising the first diaphragm (203), the two moveable first driver parts (205*a*, 205*b*) and the first diaphragm support member (207), the second diaphragm assembly comprising the second diaphragm (204), the two moveable second driver parts (206*a*, 206*b*) and the second diaphragm support member (208), wherein a weight of the first diaphragm assembly is substantially equal to a weight of the second diaphragm assembly.

Embodiment B9. The speaker device (201) according to any of embodiments B1-B8, further comprising a support structure (211) arranged on the second side (201*b*) and a secondary speaker member (212) mounted to the support structure (211), wherein the secondary speaker member (212) is supported next to the second diaphragm (204) spaced apart therefrom.

Embodiment B10. The speaker device (201) according to embodiment B9, wherein the second diaphragm (204) is a concave diaphragm providing a concave space, wherein the secondary speaker member (212) is at least in part arranged in the concave space.

Embodiment B11. The speaker device (201) according to embodiment B9 or B10, wherein the support structure (211) comprises a plurality of support legs (211*a*, 211*b*) peripherally mounted along the second side (201*b*) around the second diaphragm (204) and extending toward the secondary speaker member (212).

Embodiment B12. The speaker device (201) according to embodiment B11, wherein each support leg of the plurality of support legs (211*a*, 211*b*) is an arched support leg comprising an arched section projecting away from the second side (201*b*).

Embodiment B13. The speaker device (201) according to any of embodiments B1-B12, wherein the first speaker driver (205) and the second speaker driver (206) are arranged in a same plane.

Embodiment C1. A speaker device (301) comprising a frame (302) having a first frame side (302*a*) and a spaced apart opposing second frame side (302*b*), a first diaphragm (303) is mounted in the frame (302) at the first frame side (302*a*) and an opposing second diaphragm (304) is mounted in the frame (302) at the second frame side (302*b*): a first speaker driver (305) configured to drive the first diaphragm (303) and a second speaker driver (306) configured to drive the second diaphragm (304): a printed circuit board (307), PCB, electrically connected to the first and second speaker driver (305, 306) and wherein the PCB (307) provides one or more positions (308) for connecting the speaker device (301) to an external device, and wherein the first frame side (302*a*) and/or the second frame side (302*b*) of the frame (302) comprises the PCB (307).

Embodiment C2. The speaker device (301) according to embodiment C1, wherein the PCB (307) comprises sensor electronics and/or or integrated chips.

Embodiment C3. The speaker device (301) according to embodiment C2, wherein the sensor electronics and/or the integrated chips comprise at least one of: a temperature sensor, an accelerometer, a gyroscope, a magnetometer, a proximity sensor, a microphone, a frequency filtering element, a microprocessor, a barometer, a thermometer, an air humidity sensor.

Embodiment C4. The speaker device (301) according to any of embodiments C1-C3, wherein the PCB (307) is made of FR-2, FR-4 and/or a metal.

Embodiment C5. The speaker device (301) according to any of embodiments C1-C4, wherein the PCB (307) comprises a plurality of layers.

Embodiment C6. The speaker device (301) according to any of embodiments C1-C5, wherein the PCB (307) is integrally formed with the first frame side (302*a*) and/or the second frame side (302*b*).

Embodiment C7. The speaker device (301) according to any of embodiments C1-C5, wherein the PCB (307) is mechanically bonded to the first and/or the second frame side (302*a*, 302*b*).

Embodiment C8. The speaker device (301) according to any of embodiments C1-C5, wherein the PCB (307) is chemically bonded to the first and/or the second frame side (302*a*, 302*b*).

Embodiment C9. The speaker device (301) according to any of embodiments C1-C8, wherein the PCB (7*b*) provides one or more further positions (309) for electrically connecting one or more external speakers to the PCB (307).

Embodiment C10. The speaker device (301) according to any of embodiments C1-C9, wherein the PCB (307) comprises a first PCB part (307*a*) on the first frame side (302*a*) and a second PCB part (307*b*) on the second frame side (302*b*), wherein the first and second PCB parts (307*a*, 307*b*) are electrically connected along the frame (302).

Embodiment C11. The speaker device (301) according to any of embodiments C1-C10, wherein the PCB (307) comprises one or more openings (310*a*, 310*b*) through which the first and/or the second diaphragm (303, 304) extend.

We claim:

1. A speaker device comprising:

a frame, a first diaphragm and a second diaphragm, wherein the frame comprises a first frame part on which the first diaphragm is mounted and an opposing second frame part on which the second diaphragm is mounted;

a first speaker driver configured to drive the first diaphragm and a second speaker driver configured to drive the second diaphragm, the first speaker driver comprising a movable first coil bracket and a first diaphragm connecting member connected to the first diaphragm and the first coil bracket, and the second speaker driver comprising a movable second coil bracket and a second diaphragm connecting member connected to the second diaphragm and the second coil bracket; and a resilient first damper member connecting the first coil bracket to the first frame part and a resilient second damper member connecting the second coil bracket to the second frame part, wherein the first frame part, the first coil bracket and the first damper member form a first single piece integrally formed unitary component, and wherein the second frame part, the second coil bracket and the second damper member form a second single piece integrally formed unitary component.

2. The speaker device according to claim 1, wherein the first and second damper members each have a thickness smaller than a thickness of the first and second frame part respectively.

3. The speaker device according to claim 1, wherein the first coil bracket and the first damper member form a side-by-side arrangement in a same first plane, and wherein the second coil bracket and the second damper member form a side-by-side arrangement in a same second plane.

4. The speaker device according to claim 1, wherein the first damper member comprises at least two resilient first damper legs each of which connects the first coil bracket to the first frame part; wherein the second damper member comprises at least two resilient second damper legs each of which connects the second coil bracket to the second frame part.

5. The speaker device according to claim 1, further comprising:

a first damper support part extending between the first damper member and the first frame part; and a second damper support part extending between the second damper member and the second frame part.

6. The speaker device according to claim 1, wherein the first and second frame parts each comprise a plurality of cavities each of which is arranged to receive a part of the first and second speaker drivers.

7. The speaker device according to claim 1, comprising a first side and a spaced apart opposing second side, wherein the first diaphragm is mounted in the frame at the first side and the second diaphragm is mounted in the frame at the second side; and wherein the first diaphragm and second diaphragm have different shapes.

8. The speaker device according to claim 7, wherein the first diaphragm is a substantially flat diaphragm and wherein the second diaphragm is a concave diaphragm.

9. The speaker device according to claim 7, further comprising a first diaphragm support member connected to the first speaker driver and extending along the first diaphragm for support thereof, and a second diaphragm support member connected to the second speaker driver and extending along the second diaphragm for support thereof, and wherein the first diaphragm support member and the second diaphragm support member are rotationally offset at an angle (α) between 45° and 90° as measured in a plane parallel to the first or the second side.

10. The speaker device according to claim 9, wherein the first diaphragm support member comprises one or more recessed center sections extending along the first diaphragm and wherein the second diaphragm support member is movably received in the one or more recessed center section.

11. The speaker device according to claim 9, wherein the second diaphragm support member comprises one or more cut-outs for movably receiving the first diaphragm support member.

12. The speaker device according to claim 9, wherein the first speaker driver comprises two spaced apart moveable first driver parts and wherein the first diaphragm support member extends between the two first driver parts, and wherein the second speaker driver comprises two spaced apart moveable second driver parts and wherein the second diaphragm support member extends between the two second driver parts.

13. The speaker device according to claim 12, wherein the first diaphragm support member and the second diaphragm support member are rotationally offset at an angle (α) of 90° degrees.

14. The speaker device according to claim 12, further comprising a first diaphragm assembly and a second diaphragm assembly;

the first diaphragm assembly comprising the first diaphragm, the two moveable first driver parts and the first diaphragm support member;

the second diaphragm assembly comprising the second diaphragm, the two moveable second driver parts and the second diaphragm support member, and, wherein a weight of the first diaphragm assembly is substantially equal to a weight of the second diaphragm assembly.

15. The speaker device according to claim 1, wherein the frame has a first frame side and a spaced apart opposing second frame side, wherein the first diaphragm is mounted in the frame at the first frame side and wherein the second diaphragm is mounted in the frame at the second frame side, and wherein the speaker device further comprises:

a printed circuit board, PCB, electrically connected to the first and second speaker driver and wherein the PCB provides one or more positions for connecting the speaker device to an external device, wherein the first frame side and/or the second frame side of the frame comprises the PCB.

16. The speaker device according to claim 15, wherein the PCB comprises sensor electronics and/or or integrated chips.

17. The speaker device according to claim 15, wherein the PCB is integrally formed with the first frame side and/or the second frame side.

18. The speaker device according to claim 15, wherein the PCB is mechanically bonded to the first and/or the second frame side.

19. The speaker device according to claim 15, wherein the PCB is chemically bonded to the first and/or the second frame side.

20. The speaker device according to claim 15, wherein the PCB comprises a first PCB part on the first frame side and a second PCB part on the second frame side, wherein the first and second PCB parts are electrically connected along the frame.

* * * * *